United States Patent
Kuo (10) Patent No.: US 10,402,144 B2
(45) Date of Patent: Sep. 3, 2019

(54) PORTABLE ELECTRONIC DEVICE AND OPERATION METHOD THEREOF

(71) Applicant: Wistron Corporation, New Taipei (TW)

(72) Inventor: Chun-Lun Kuo, New Taipei (TW)

(73) Assignee: Wistron Corporation, New Taipei (TW)

( * ) Notice: Subject to any disclaimer, the term of this patent is extended or adjusted under 35 U.S.C. 154(b) by 96 days.

(21) Appl. No.: 15/687,559

(22) Filed: Aug. 28, 2017

(65) Prior Publication Data

US 2018/0335995 A1 Nov. 22, 2018

(30) Foreign Application Priority Data

May 16, 2017 (TW) .............................. 106116054 A (51) Int. Cl.
*G06F 3/02* (2006.01)
*G06F 3/14* (2006.01)
(Continued)

(52) U.S. Cl.
CPC ............ *G06F 3/1423* (2013.01); *G06F 1/169* (2013.01); *G06F 1/1626* (2013.01);
(Continued)

(58) Field of Classification Search
CPC ............ G06F 3/02; G06F 3/041; G06F 3/045; G09G 5/00; G01R 27/26
See application file for complete search history.

(56) References Cited

U.S. PATENT DOCUMENTS 9,292,111 B2 3/2016 Westerman et al.
9,342,214 B2 5/2016 Xia et al.
(Continued)

FOREIGN PATENT DOCUMENTS

CN 102854982 1/2013
CN 103513817 1/2014
(Continued)

OTHER PUBLICATIONS

"Office Action of Taiwan Counterpart Application," dated Jun. 5, 2018, p. 1-p. 13.
(Continued)

*Primary Examiner* — Pegeman Karimi
(74) *Attorney, Agent, or Firm* — JCIPRNET (57) ABSTRACT

A portable electronic device including a first touch display device, a second touch display device and a processing device is provided. The first touch display device is disposed on a first surface of a device body and configured to display a first image frame. The second touch display device is disposed on a second surface of the device body, configured to display a second image frame and receives a touch input. The processing device is coupled to the first touch display and the second touch display. The processing device is configured to verify gesture information of the touch input to determine whether to execute an application associated with the gesture information. The first image frame of the first touch display device correspond to the application. In addition, a method of operating the portable electronic device is also provided.

14 Claims, 11 Drawing Sheets

(51) Int. Cl.

| | | |
|---|---|---|
| *G06F 3/0488* | (2013.01) | |
| *G06F 3/041* | (2006.01) | |
| *G06F 21/32* | (2013.01) | |
| *G06F 1/16* | (2006.01) | |
| *G09G 3/20* | (2006.01) | |
| *G06K 9/00* | (2006.01) | |
| *G06K 9/22* | (2006.01) | |
| *G06F 3/01* | (2006.01) | |
| *G09G 3/34* | (2006.01) | |

(52) U.S. Cl.
CPC .......... *G06F 1/1643* (2013.01); *G06F 1/1647* (2013.01); *G06F 3/017* (2013.01); *G06F 3/0418* (2013.01); *G06F 3/04883* (2013.01); *G06F 21/32* (2013.01); *G06K 9/00355* (2013.01); *G06K 9/22* (2013.01); *G09G 3/20* (2013.01); *G06F 3/016* (2013.01); *G06F 2200/1637* (2013.01); *G06F 2203/04104* (2013.01); *G06K 9/00013* (2013.01); *G09G 3/3453* (2013.01); *G09G 2310/0221* (2013.01); *G09G 2330/022* (2013.01); *G09G 2354/00* (2013.01); *G09G 2360/144* (2013.01); *G09G 2360/145* (2013.01)

(56) References Cited

U.S. PATENT DOCUMENTS

| | | | |
|---|---|---|---|
| 2007/0077541 A1* | 4/2007 | Champagne | G06F 17/5009 434/62 |
| 2008/0036743 A1 | 2/2008 | Westerman et al. | |
| 2011/0090155 A1 | 4/2011 | Caskey et al. | |
| 2013/0076595 A1* | 3/2013 | Sirpal | G06F 3/1438 345/1.3 |
| 2013/0215060 A1* | 8/2013 | Nakamura | G06F 1/1626 345/173 |
| 2013/0321340 A1* | 12/2013 | Seo | G06F 1/1641 345/174 |
| 2014/0055429 A1* | 2/2014 | Kwon | G09G 3/001 345/204 |
| 2016/0034138 A1 | 2/2016 | Xia et al. | |
| 2016/0188067 A1* | 6/2016 | Hou | G06F 3/0488 345/173 |
| 2016/0227022 A1* | 8/2016 | Alameh | G06F 1/1643 |
| 2017/0230640 A1* | 8/2017 | Rochford | H04N 13/344 |
| 2018/0060550 A1* | 3/2018 | Li | G06F 21/32 |
| 2018/0074636 A1* | 3/2018 | Lee | G06F 3/0414 |

FOREIGN PATENT DOCUMENTS

| | | |
|---|---|---|
| CN | 105930078 | 9/2016 |
| TW | 200847001 | 12/2008 |
| TW | 201108199 | 3/2011 |
| TW | 201140421 | 11/2011 |
| TW | 201332336 | 8/2013 |
| TW | 201624258 | 7/2016 |

OTHER PUBLICATIONS

"Office Action of Taiwan Counterpart Application", dated Sep. 12, 2018, p. 1-p. 12.

"Office Action of Taiwan Counterpart Appfication," dated Mar. 15, 2018, p. 1-p. 9.

\* cited by examiner

PORTABLE ELECTRONIC DEVICE AND OPERATION METHOD THEREOF

CROSS-REFERENCE TO RELATED APPLICATION

This application claims the priority benefit of Taiwan application serial no. 106116054, filed on May 16, 2017. The entirety of the above-mentioned patent application is hereby incorporated by reference herein and made a part of this specification.

BACKGROUND OF THE INVENTION

1. Field of the Invention

The invention relates to an electronic device and particularly relates to a portable electronic device and an operation method of the portable electronic device.

2. Description of Related Art

With advances in the touch technology, a touch device has increasingly become basis equipment for portable electronic devices such as a laptop, a mobile phone, a tablet or a portable multimedia player, and a trend of a new generation of input devices, where the touch device substitutes for a traditional keyboard or physical buttons, arises. Nonetheless, in the prior art, if the portable electronic device provides a touch function only through a main screen, operating demands of a user or an application may hardly be satisfied. Consequently, how to enable the portable electronic device to provide more versatile touch functions to allow the user to utilize the portable electronic device in a convenient and versatile manner is one of the most importance issues at present.

SUMMARY OF THE INVENTION

A portable electronic device and an operation method of the portable electronic device according to embodiments of the invention provide a convenient and vertical operation method by allowing a first image frame of a first touch display device to correspond to a result of a touch input received by a second touch display device.

A portable electronic device according to embodiments of the invention includes a device body. The portable electronic device includes a first touch display device, a second touch display device and a processing device. The first touch display device is disposed on a first surface of the device body and configured to display the first image frame. The second touch display device is disposed on a second surface of the device body, configured to display a second image frame and receives a touch input. The first surface is opposite to the second surface. The processing device is coupled to the first touch display device and the second touch display device. The processing device is configured to verify gesture information of the touch input to deter mine whether to execute an application associated with the gesture information. The first image frame of the first touch display device is determined by the application.

A method of operating the portable electronic device according to embodiments of the invention is suitable for the portable electronic device. The portable electronic device includes the first touch display device and the second touch display device. The operation method includes the following steps: receiving the touch input through the second touch display device; verifying gesture information of the touch input to determine whether to execute an application associated with the gesture information, wherein a first image frame of the first touch display is determined by the application.

Based on the above, the portable electronic device according to the embodiments of the invention may include the first touch display device and the second touch display device to provide versatile display information. Moreover, the image frame of the first touch display device may provide convenient and versatile touch functions by corresponding to the touch input received by the second touch display device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
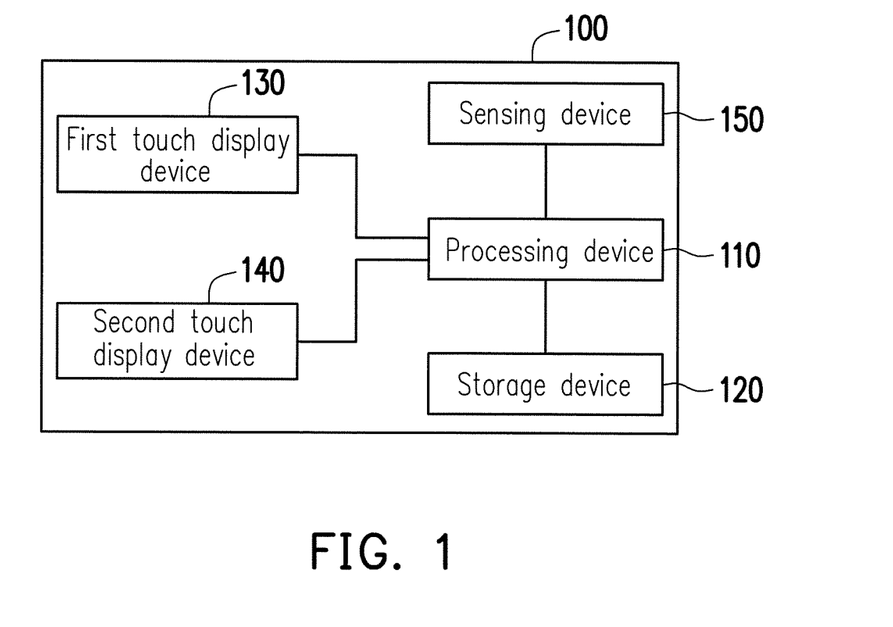
FIG. 1 is a block diagram of a portable electronic device according to an embodiment of the invention.

FIG. 1 is a block diagram of a portable electronic device according to an embodiment of the invention. Referring to FIG. 1, a portable electronic device 100 includes a processing device 110, a storage device 120, a first touch display device 130, a second touch display device 140 and a sensing device 150. In the embodiment, the portable electronic device 100 may be, for example, a cell phone, a smartphone, a personal digital assistor (PDA), a tablet (Table PC) or such like. The portable electronic device 100 is able to display a first image frame and a second image frame through the first touch display device 130 and the second touch display device 140 and to perform all kinds of application operations with the first touch display device 130 and the second touch display device 140 respectively receiving a touch input. In the embodiment, the processing device 110 is able to perform a relevant application based on a result of the touch input received by the second touch display device 140, so that the relevant application determines the content of the first image frame of the first touch display device 130.

In the embodiment, the processing device 110 may be, for example, a central processing unit (CPU), or other programmable devices with an ordinary or special use such as a microprocessor, a digital signal processor (DSP), a programmable controller, application specific integrated circuits (ASIC), a programmable logic device (PLC), other similar processing devices or combinations of these devices.

In the embodiment, the storage device 120 may be, for example, a dynamic random access memory (DRAM), a flash memory, a non-volatile random access memory (NVRAM) or such like. The storage device 120 is able to store a plurality of modules that are read and executed by the processing device 110. In the embodiment, the processing device 110 may be configured to execute these modules to arrive at the operation methods and relevant procedures as described in each embodiment of the invention.

In the embodiment, the first touch display device 130 and the second touch display device 140 may include a display panel and a touch panel respectively. The display panel may be disposed below or above the touch panel, and the invention is not limited thereto. The first touch display device 130 and the second touch display device 140 may be configured to display the image frame and receive the touch input respectively, so that the processing device 110 executes the relevant application according to the result of the touch input. More specifically, the touch panels of the first touch display device 130 and the second touch display device 140 may be, for example, optical touch panels, capacitive touch panels, resistive touch panels or such like. The display panel of the first touch display device 130 may be, for example, a liquid crystal display panel, an organic electro-luminescence display panel, a plasma display panel, an electronic paper panel, an electro wetting display panel or other types of display panels, but the invention is not limited thereto. In the embodiment, the display panel of the second touch display device 140 according to the embodiments of the invention may be the electronic paper panel and operated in an information mode or a picture mode, but the invention is not limited thereto. In an embodiment, the display panel of the second touch display device 140 may also be, for example, a variety of display panels as described above.

In the embodiment, the sensing device 150 may be disposed on a side of the portable electronic device 100 near the second touch display device 140 or integrated with the second touch display device 140, but the invention is not limited thereto. In the embodiment, the sensing device 150 may be configured to sense a screen orientation and surrounding situations of the second touch display device 140. In the embodiment, the sensing device 150 may include a light sensor and a 3-axial sensor that are configured to sense a vertical axial parameter and an illumination parameter, so that the processing device 100 may determine the second image frame of the second touch display 140 as the information mode or the picture mode according to the vertical axial parameter and the illumination parameter.

Figure 2A:
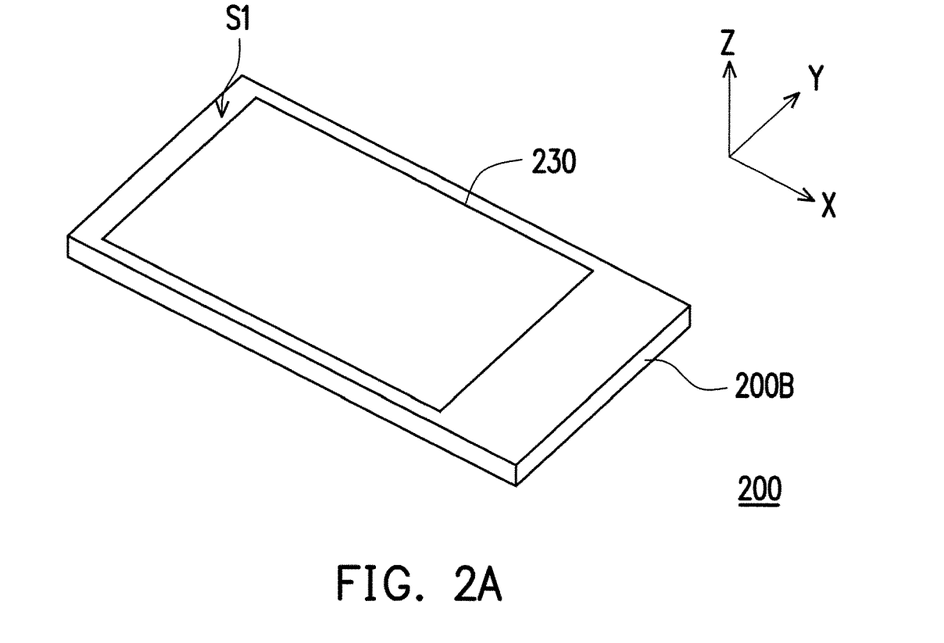
FIG. 2A is a front view of a portable electronic device according to an embodiment of the invention.
Figure 2B:
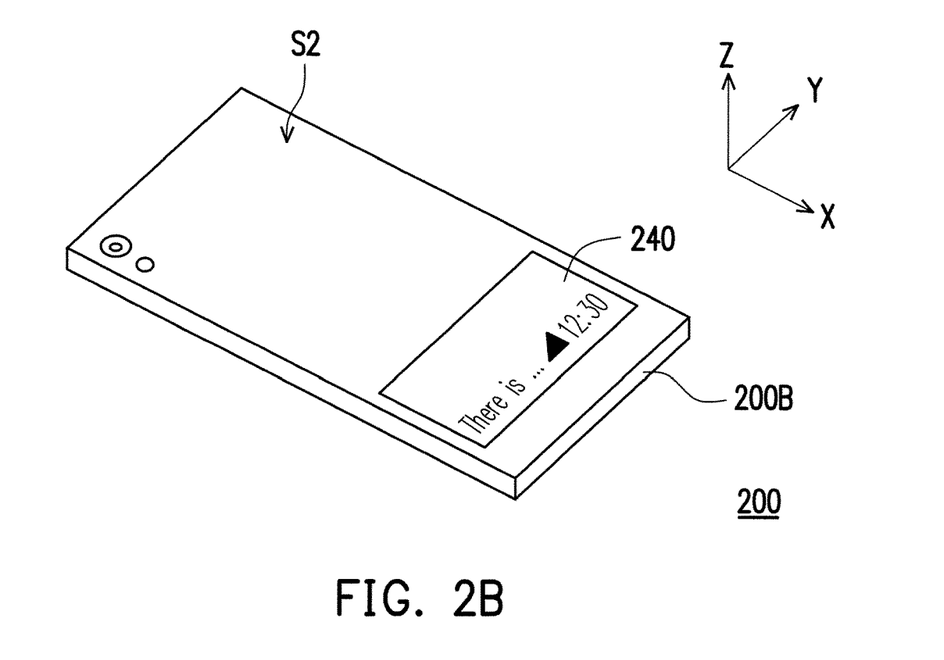
FIG. 2B is a rear view of a portable electronic device according to an embodiment of the invention.

FIG. 2A is a front view of the portable electronic device according to an embodiment of the invention. Referring to FIG. 2A, a portable electronic device 200 includes a device body 200B. A first surface S1 (the front) of the device body 200B may include a first touch display device 230 (a main screen). FIG. 2B is a rear view of a portable electronic device according to an embodiment of the invention. Referring to FIG. 2B, a second surface S2 (the rear) of the device body 200B may include a second touch display device 240 (a sub-screen). The first surface S1 is opposite to the second S2. In other words, in the case of FIG. 2A, the image frame of the second touch display device 140 is the picture mode; in the case of FIG. 2B, the image frame of the second touch display device 140 is the information mode. In the embodiment, the information mode may provide functions such as a text message reminder, time display, electricity information or such like, but the invention is not limited thereto. In other words, even though the first touch display device 230 of the portable electronic device 200 is lying downward, a user may also obtain relevant information through the second touch display device 240.

For example, referring to FIGS. 2A and 2B, when the screen of the second touch display device 240 is lying downward, the vertical axial parameter may be 0 or negative with the illumination parameter being less than a default threshold value such as 40 lux. Consequently, the processing device determines the second touch display device 240 as lying downward and operates the image frame of the second touch display device 240 to become the picture mode. In other words, since the user may not be able to directly watch the image frame of the second touch display device 240 at present, the second touch display device 240 is able to display the personalized picture mode. For another example, when the screen of the second touch display device 240 is lying upward, the vertical axial parameter may be positive, or the illumination parameter may be larger than the default threshold value such as 40 lux. Consequently, the processing device determines the second touch display device 240 as lying upward and operates the image frame of the second touch display device 240 to become the information mode. In other words, since the user may be able to watch the image frame of the second touch display device 240 at present, the second touch display device 240 is able to display the personalized information mode.

In the embodiments of FIGS. 2A and 2B, coordinate axes x and y are horizontal axes, and z axis is a vertical axis. In the embodiment, when the second touch display 240 is lying upward, a z component of a normal vector of the second surface S2 of the device body 200B is positive; when the second touch display 240 is lying downward, the z component of the normal vector of the second surface S2 of the device body 200B is negative.

Figure 3:
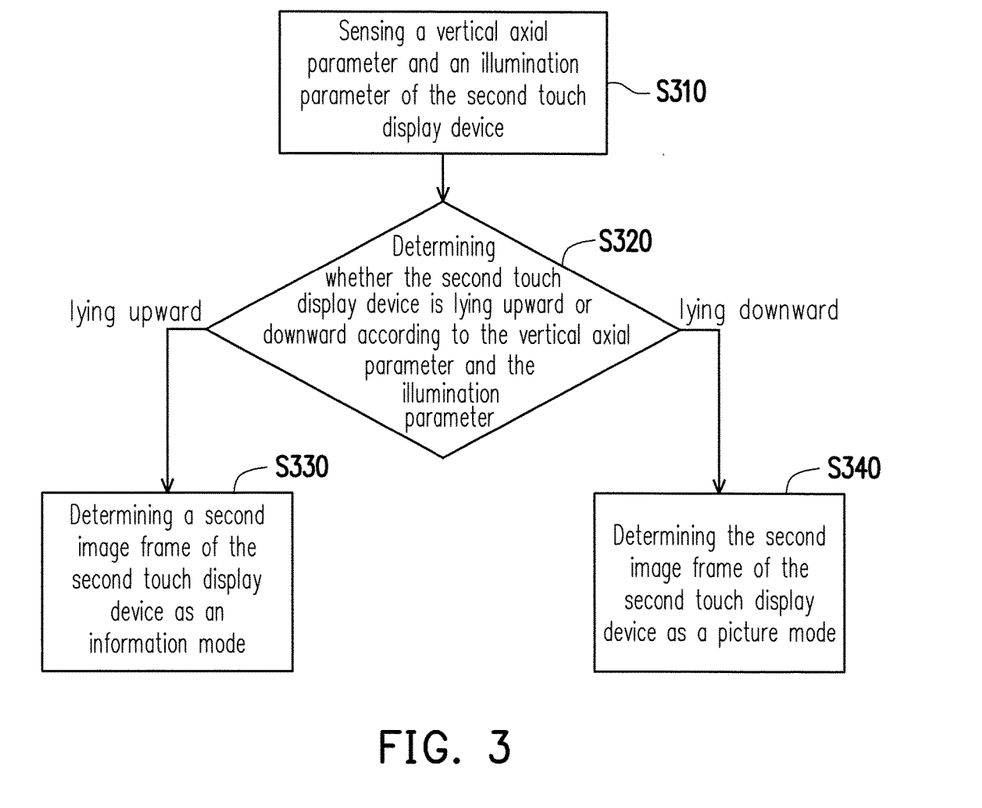
FIG. 3 is a flowchart of determination of a display mode of a second touch display device according to an embodiment of the invention.

FIG. 3 is a flowchart of determination of the display mode of the second touch display device according to an embodiment of the invention. Referring to FIGS. 1 and 3, the operation method of FIG. 3 may be at least suitable for the portable electronic device 100 of FIG. 1. In step S310, with the sensing device 150, the portable electronic device 100 senses the vertical axial parameter of the second touch display device 140 and the illumination parameter of surrounding situations where the second touch display device 140 is disposed. Then, in step S320, the processing device 110 determines the second touch display device 140 as lying upward or downward based on the vertical axial parameter and the illumination parameter. Then, step S330, when the second touch display device 140 is lying upward, the processing device 110 may determine the second image frame of the second touch display device 140 as the information mode. On the contrary, in step S340, when the second touch display device 140 is lying downward, the processing device 110 may determine the second image frame of the second touch display device 140 as the picture mode.

Figure 4:
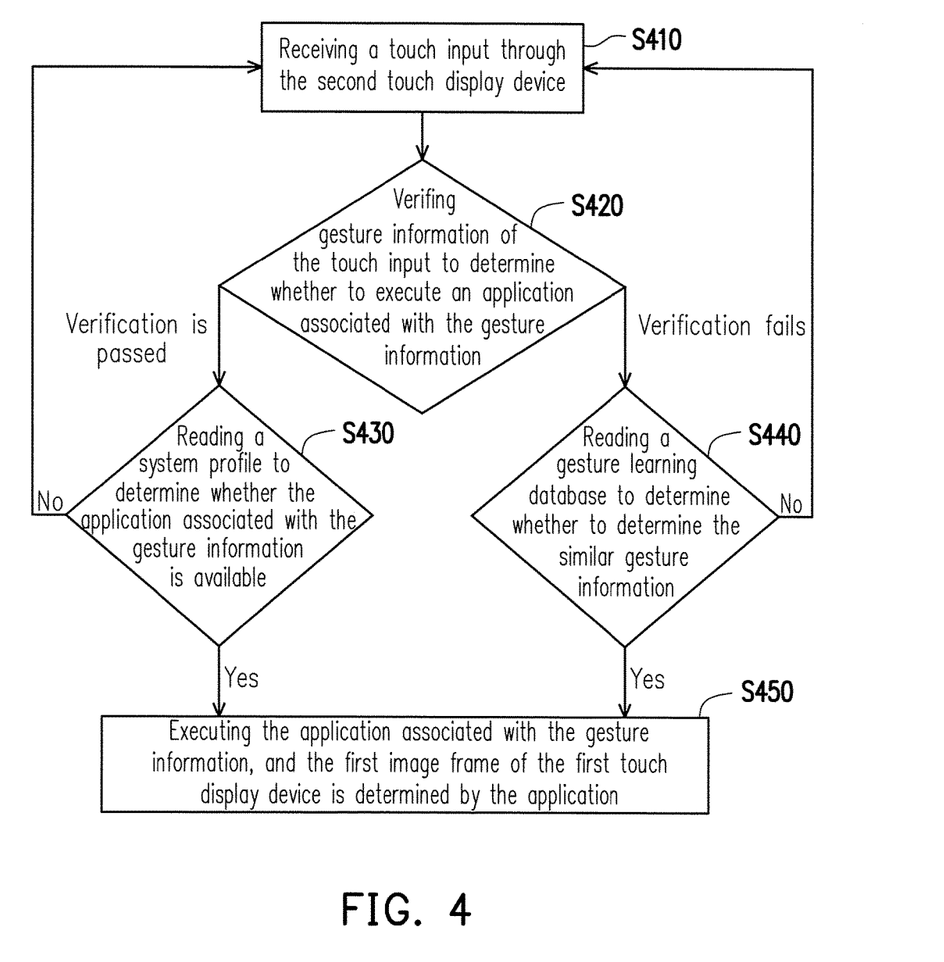
FIG. 4 is a flowchart of an operation method according to an embodiment of the invention.

FIG. 4 is a flowchart of the operation method according to an embodiment of the invention. Referring to FIGS. 1 and 4, the operation method of FIG. 4 may be at least suitable for the portable electronic device 100 of FIG. 1. In the embodiment, the processing device 110 may receive the touch input through the second touch display device 140. The touch input may include gesture information. Moreover, the processing device 110 may verify whether the gesture information of the touch input conforms to default gesture information stored in the storage device 120 to set the content of the first image frame of the first touch display device 130 so as to correspond to the touch input. The first touch display device 130 and the second touch display device 140 work independently. Consequently, in step S410, the processing device 100 receives the touch input through the second touch display device 140. In step S420, the processing device 110 verifies the gesture information of the touch input. More specifically, in an embodiment, the processing device 110 verifies whether the gesture information of the touch input is a default basic gesture.

When verification passes, step S430 is taken. In step S430, the processing device 110 reads a system profile stored in the storage device 120 to conform whether an application related to the gesture information is available. If not, the processing device 110 executes step S410 again. If yes, the processing device 110 executes step S450. More specifically, in an embodiment, the processing device 110 reads the system profile stored in the storage device 120 to confirm whether the application related to the gesture information is available. The system profile may be, for example, a word profile called "build.prop" under the Android operating system. If no application related to the gesture information is available in the system profile, the processing device 110 executes step S410 again. On the contrary, the processing device 110 executes step S450. In another embodiment, the processing device 110 reads the system profile stored in the storage device 120 to confirm whether an application related to a handheld mode (a left-hand mode, a right-hand mode or a both-hand mode) and corresponding to the gesture information is available.

When verification fails, the processing device 110 executes step S440. In step S440, the processing device 110 may read a gesture learning database stored in the storage device 120 to confirm whether to define the similar gesture information. In the embodiment, the gesture learning database is stored in the storage device 120 and includes all kinds of gesture movements and corresponding applications executed by the corresponding gesture movements on the second touch display device 140. The gesture learning database, may be, the word profile called "build.prop" under the Android operating system. If no similar gesture information is defined in the gesture learning database, the processing device 110 executes step S410 again. If it is certain to define the similar gesture information in the gesture learning database, the processing device 110 executes step S450.

In step S450, when determination conditions in each step are met, the processing device 110 may execute the application related to the gesture information, and the first image frame of the first touch display device 130 is determined by the application. In the embodiment, the application may be, for example, an unlocking program, a login program, a music-playing program, a game program, a working program or such like. In other words, with the second touch display device 140 of the portable electronic device 100, the user may make the application shown in the first touch display device 130, so as to correspond to the gesture information input by the user for interaction. In another embodiment, the processing device 110 may execute the application associated with the handheld mode (the left-hand mode, the right-hand mode or the both-hand mode) and the gesture information, and the first image frame of the first touch display device 130 is determined by the application. In addition, regarding details of executing the gesture verification as described in the embodiment, common general knowledge provides sufficient teachings, suggestions and descriptions about implementation, so it is unnecessary to give more details here.

In the embodiment, the gesture information input by the user may, for example, refer to the fact that the user slides the second touch display device 140 in a specific direction with fingers such as sliding to the left or right. Moreover, the system profile of the portable electronic device 100 may have default arrangement that when the gesture information input by the user conforms to a gesture of the user sliding to the left or right, the processing device 110 may execute a specific application correspondingly, for example, an unlocking movement, a movement of waking up a screen, a movement of adjusting the volume, control on music or such like, but the invention is not limited thereto.

Figure 5:
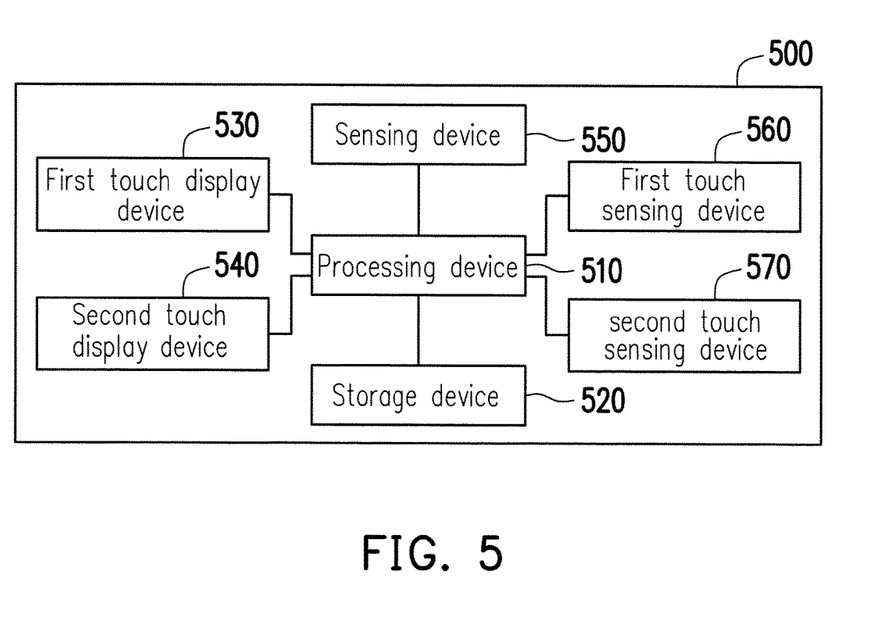
FIG. 5 is a block diagram of a portable electronic device according to yet another embodiment of the invention.

FIG. 5 is a block diagram of the portable electronic device according to yet another embodiment of the invention. Referring to FIG. 5, a portable electronic device 500 includes a processing device 510, a storage device 520, a first touch display device 530, a second touch display device 540 and a sensing device 550. Moreover, the portable electronic device 500 according to the embodiments of the invention further includes a first touch sensing device 560 and a second touch sensing device 570. In the embodiment, the portable electronic device 500 receives first touch information and second touch information through the first touch sensing device 560 and the second touch sensing device 570 respectively. The processing device 510 may determine an operating mode of the portable electronic device 500 based on the first touch information and the second touch information. In addition, in an embodiment, the processing device 510 may further determine hand print (palm print) feature information of at least one of the first touch information and the second touch information to execute an unlocking operation.

In the embodiment, the first touch sensing device 560 and the second touch sensing device 570 may be optical touch panels, capacitive touch panels, resistive touch panels or such like. The first touch sensing device 560 and the second touch sensing device 570 may be configured to sense distribution of touch points where the user holds the portable electronic device 500, so that the processing device 510 may determine the operating mode of the portable electronic device 500 according to the distribution of the touch points of the first touch sensing device 560 and the second touch sensing device 570.

In an embodiment, the first touch sensing device 560 and the second touch sensing device 570 may further include a force sensor. The first touch sensing device 560 and the second touch sensing device 570 may respectively further sense a press force by the user and provide a corresponding force feedback. Moreover, the portable electronic device 500 may correspondingly execute a relevant application based on a result of the first touch sensing device 560 and the second touch sensing device 570 sensing the press force by the user or make the relevant application correspond to the result of the press force by the user, but the invention is not limited thereto.

In addition, in the embodiment, regarding the features and implementing details of the processing device 510, the storage device 520, the first touch display device 530, the second touch display device 540 and the sensing device 550, the embodiments in FIGS. 1-4 provide sufficient teachings, suggestions and descriptions about implementation. Therefore, it is unnecessary to give more details here.

Figure 6A:
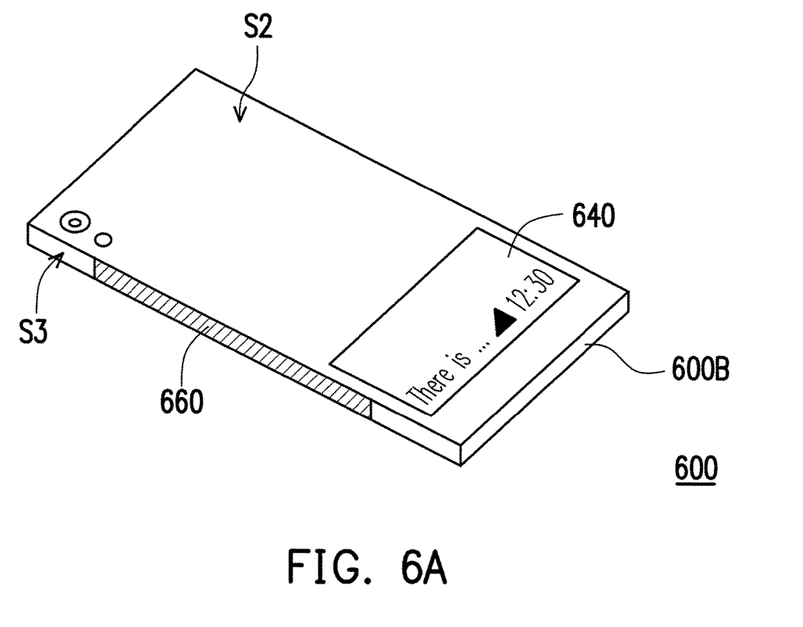
FIG. 6A is a side view of a portable electronic device according to an embodiment of the invention.
Figure 6B:
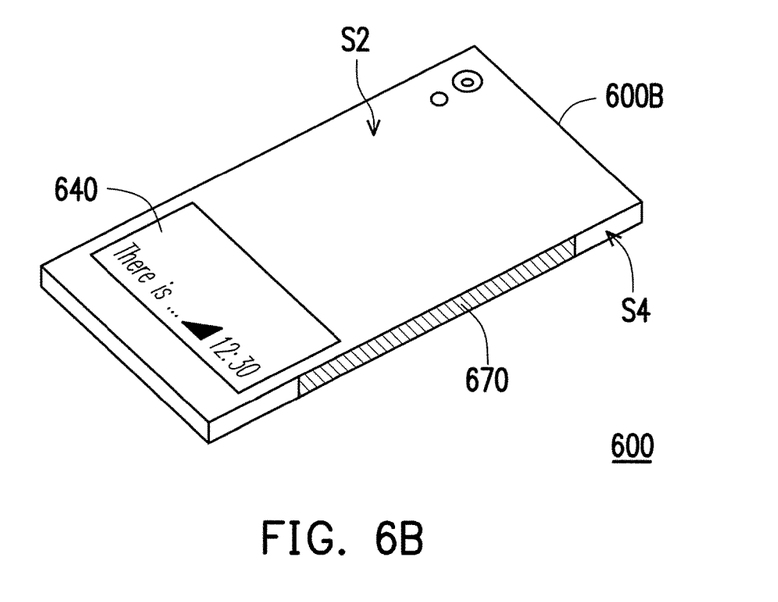
FIG. 6B is another side view of a portable electronic device according to an embodiment of the invention.

FIG. 6 is a side view of the portable electronic device according to an embodiment of the invention. Referring to FIG. 6A, a portable electronic device 600 includes a device body 600B. A second surface S2 (the rear) of a device body 200B may include a second touch display device 640. A third surface S3 (side face) of the device body 200B may include a first touch sensing device 660. FIG. 6B is another side view of the portable electronic device according to an embodiment of the invention. Referring to FIG. 6B, a fourth surface S4 (another side face) of the device body 200B may include a second touch sensing device 670. The third surface S3 is opposite to the fourth surface S4. In the embodiment, the first touch sensing device 660 and the second touch sensing device 670 may be disposed on left and right sides of the device body 600B respectively to sense the manner how the user holds the portable electronic device 600, for example, the user holds the device body 600B with the left hand, right hand or both hands.

Figure 7A:
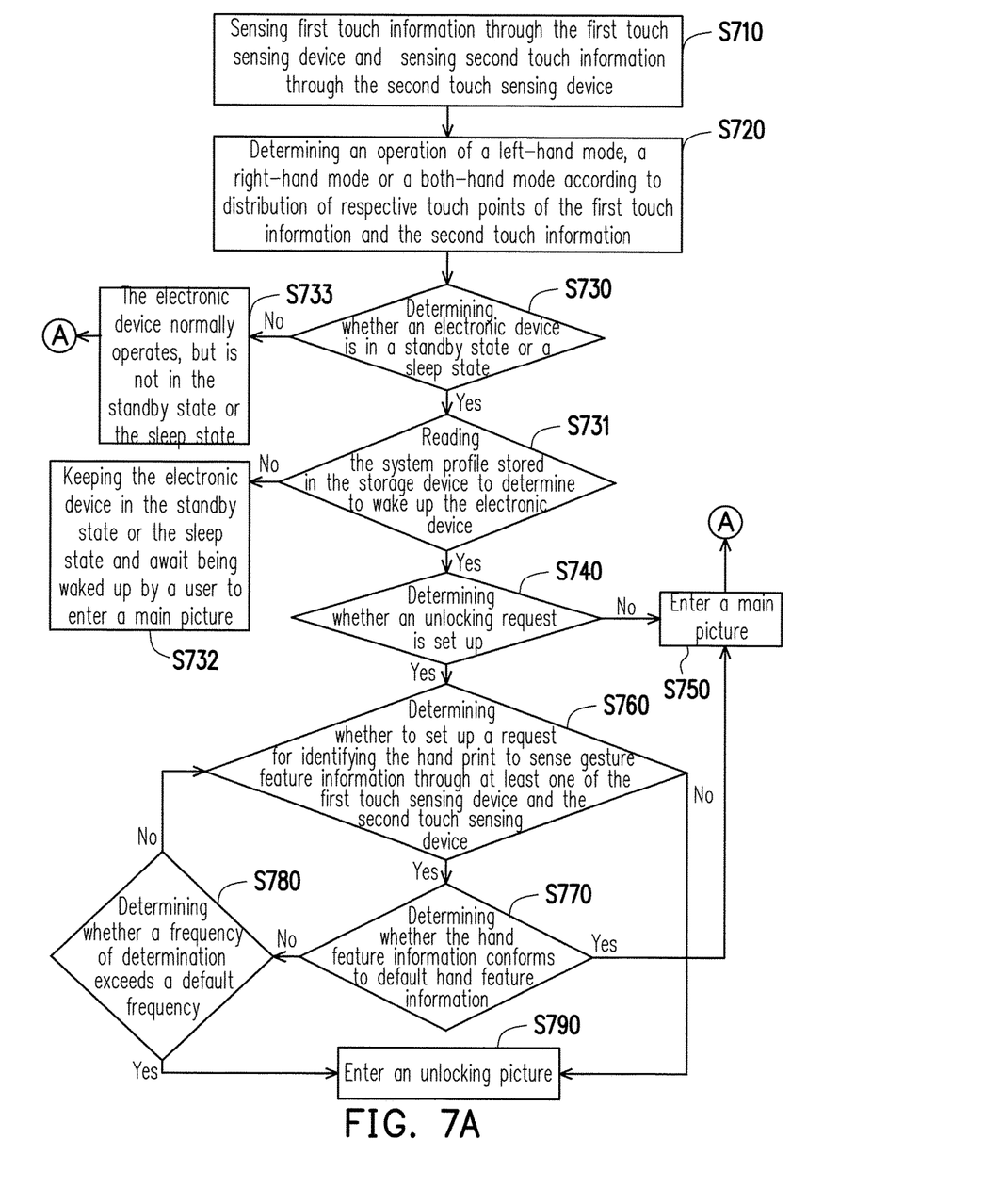
FIGS. 7A and 7B are flowcharts of an operation method according to yet another embodiment of the invention.
Figure 7B:
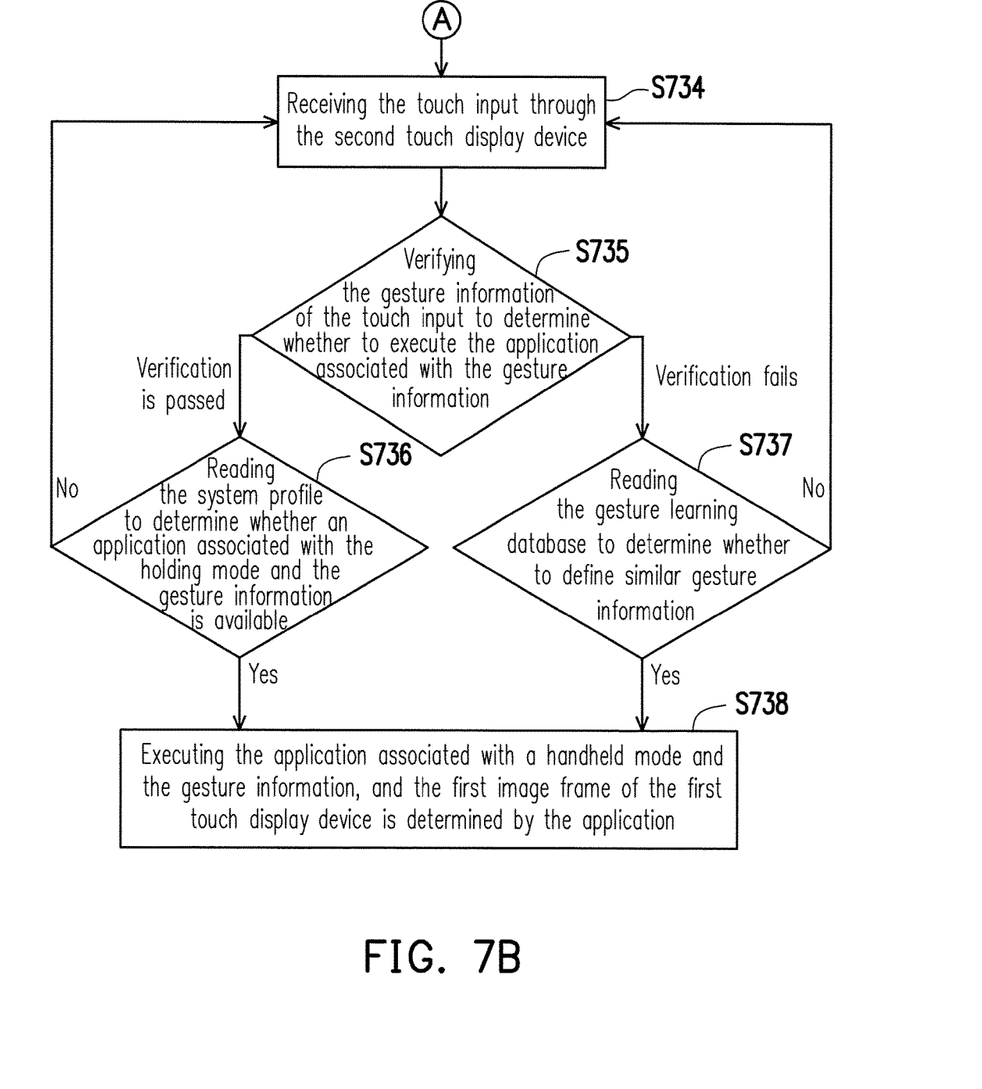

FIGS. 7A and 7B are flowcharts of the operation method according to yet another embodiment of the invention. Referring to FIGS. 5, 7A and 7B, the operation methods in FIGS. 7A and 7B may be suitable for at least the portable electronic device 500 of FIG. 5. In FIG. 7A, the processing device 510 may determine that the portable electronic device 500 executes the left-hand mode, the right-hand mode or the both-hand mode according to a touch result of the first touch sensing device 560 and the second touch sensing device 570. Moreover, when an unlocking request is set up in the portable electronic device 500, the processing device 510 may determine whether to execute an unlocking operation based on hand print information sensed by at least one of the first touch sensing device 560 and the second touch sensing device 570. Moreover, in the embodiment, the hand print information may be related to fingerprints and palm prints. However, regarding implementing details of the sensed hand print information as described in the embodiment, common general knowledge provides sufficient teachings, suggestions and descriptions about implementation. Therefore, it is unnecessary to give more details here.

In step S710, the processing device 510 may sense the first touch information through the first touch sensing device 560, and sense the second touch information through the second touch sensing device 570. In an embodiment, when the user holds the portable electronic device 500, and the processing device 510 senses the first touch information and the second touch information, the processing device 510 performs the procedures in FIGS. 7A and 7B. However, during the process, if the user lets go the portable electronic device 500, the processing device 510 executes step S710 again. In step S720, the processing device 510 determines whether to execute the left-hand mode, the right-hand mode or the both-hand mode according to the distribution of respective touch points of the first touch information and the second touch information.

In the embodiment, the left-hand mode, the right-hand mode or the both-hand mode is determined by the second touch display device 540 based on the gesture input. For example, when the user holds the portable electronic device 500 with the left hand (the processing device 510 executes the left-hand mode), the processing device 510 may determine whether the gesture input received by the second touch display device 540 is made by the finger sliding from left to right to correspondingly operate relevant applications. Alternatively, when the user holds the portable electronic device 500 with the right hand (the processing device 510 executes the right-hand mode), the processing device 510 may determine whether the gesture input received by the second touch display device 540 is made by the finger sliding from right to left to correspondingly operate the relevant applications. Alternatively, when the user holds the portable electronic device 500 with both hands (the processing device 510 executes the both-hand mode), the processing device 510 may determine whether the gesture input received by the second touch display device 540 is made by the left finger sliding from left to right and the right finger sliding from right to left to correspondingly operate the relevant applications.

In step S730, the processing device 510 determines whether the portable electronic device 500 is in a standby state or a sleep state. If yes, the processing device 510 executes step S731. Conversely, the processing device 510 executes step S733. In step S733, the portable electronic device 500 is in the standby state or the sleep state, and the processing device 510 reads the system profile stored in the storage device 120 to determine whether to wake up the portable electronic device 500. If yes, the processing device 510 executes step S740. Conversely, the processing device 510 executes step S732. In step S732, the portable electronic device 500 remains in the standby state or the sleep state and waits for being woken up voluntarily by the user to enter a main picture. In step S733, the portable electronic device 500 is in normal operation and neither in the standby state nor in the sleep state (for example, in the case that the portable electronic device 500 shows the main picture), and then the processing device 510 executes step S734.

Referring to FIG. 7B, in step S734, the processing device 510 according to the embodiments of the invention receives the touch input through the second touch display device 540. In step S735, the processing device 510 may verify whether the gesture information of the touch input is the default basic gesture. When verification is passed, the processing device 510 executes step S736; when verification fails, the processing device 510 executes step S737. In step S736, the processing device 510 reads the system profile to determine whether the application associated with the handheld mode and the gesture information is available. If yes, the processing device 510 executes step S738. Conversely, the processing device 510 executes step S734 again. In step S737, the processing device 510 reads the gesture learning database to determine whether to define the similar gesture information and whether to define the application associated with the handheld mode and the similar gesture information. If the similar gesture information and the application associated with the handheld mode and the similar gesture information are defined, the processing device 510 executes step S738. Conversely, the processing device 510 executes step S734 again. In the embodiment, the gesture learning database is stored in the storage device 120, and the gesture learning database includes all kinds of gesture movements to which each of the handheld modes corresponds as well as the corresponding applications executed by the gesture movements on the second touch display device 140. The gesture learning database may be, for example, the word profile called "build.prop" under the Android operating system. In step S738, the processing device 510 executes the application associated with the handheld mode and the gesture information, and the first image frame of the first touch display device 530 is determined by the application.

In the embodiment, the embodiments in FIG. 4 may serve as reference to the details of how to verify the gesture in steps 734 to 738 in FIG. 7B. Therefore, it is unnecessary to give more details here. The only difference between steps S734 to 738 in FIG. 7B and the embodiments in FIG. 4 is that when the gesture information of the touch input passes verification (step S735) passes verification, the system profile read by the processing device 510 includes the application associated with the handheld mode and the gesture information (step s736), and the processing device 510 further executes the application associated with the handheld mode and the gesture information (step S738).

Referring back to FIG. 7A, in step S740, the processing device 510 may determine whether the unlocking request is set up. If not, the processing device 510 executes step S750 to operate the first touch display device 530 to display the main picture, and the processing device 510 may continue executing steps S734 to S738. If yes, the processing device 510 executes step S760. In step S760, the processing device 510 further determines whether a request for identifying the hand print is set up. If not, the processing device 510 executes step S790 to operate the first touch display device 530 to display an unlocking picture. If yes, the processing device 510 executes step S770.

In step S770, the processing device 510 determines whether the hand print feature information conforms to default hand print feature information. More specifically, in an embodiment, different manners of determining the gesture (the left-hand mode, the right-hand mode, or the both-hand mode) correspond to different hand print feature information respectively. At the moment, the processing device 510 reads the default hand print feature information to which the handheld mode corresponds from the storage device 520 according to the handheld mode obtained in step S720. The processing device 510 then determines whether the hand print feature information of at least of the first touch information and the second touch information conforms to the default hand print feature information to which the handheld mode corresponds. If the hand print feature information conforms to the default hand print feature information, the processing device 510 executes step S750 to operate the first touch display device 530 to display the main picture. If the hand print feature information does not conform to the default hand print feature information, the processing device 510 executes step S780 to determine whether to execute step S760 again based on whether a frequency of determination exceeds a default frequency. For example, the default frequency may be five times. If not, the processing device 510 executes step S760 again. If yes, the processing device 510 executes step S790 to operate the first touch display device 530 to display the unlocking picture. In step S790, when the first touch display device 530 shows that the locked screen is unlocked, it means that, for example, the image frame of the first touch display device 530 changes from a sleep picture, a standby picture, or a screensaver picture into a normal image and therefore the user may operate a program or unlock a screen.

In order that the skilled person has a better understanding of how to utilize the portable electronic device according to the embodiments in FIGS. 7A and 7B, an exemplary embodiment is enumerated. In the exemplary embodiment, the portable electronic device 500 may include an application that is a music-playing program. Firstly, when the portable electronic device 500 is in the standby state and placed on a desk, the portable electronic device 500 executes the right-hand mode after confirming a sensed result (e.g. steps S710 and S720) if the user raises and holds the portable electronic device 500 with the right hand. At the moment, a touch sensing device located on the right of the portable electronic device 500 may generate a response of reminder (such as shock or a force feedback). Then, when the portable electronic device 500 determines the need to be voluntarily waked up after reading the system profile, the portable electronic device 500 performs an operation of being waked up voluntarily (e.g. steps S730 and S731). Next, unlocking setting is found in the portable electronic device 500. The portable electronic device 500 scans the hand print feature through the first touch sensing device 550 and the second touch sensing device 560. Moreover, when the hand print feature passes identification, the portable electronic device 500 enters the main picture (e.g. steps S740, S750, S760 and S770). Lastly, the user may touch the second touch sensing device 540 with the ring finger of the right hand and slide outward, so that the portable electronic device 500 verifies the gesture of the user (e.g. steps S734, s735, s736 and S738). Consequently, the portable electronic device 500 may operate the music-playing program associated with the right-hand mode and the gesture.

Another exemplary embodiment is taken for explanation. Firstly, when the portable electronic device 500 is in the normal mode and placed on a desk, the portable electronic device 500 executes the left-hand mode after conforming the sensed result (e.g. steps S710 and S720) if the user raises and holds the portable electronic device 500 with the left hand. At the moment, a touch sensing device located on the left of the portable electronic device 500 generates a response of reminder (such as shock or a force feedback). Then, the portable electronic device 500 determines that the electronic device is in normal operation rather than in the standby state or the sleep state (e.g. steps S730 and S733), and the portable electronic device 500 sense whether the touch input is present through the second touch display device 540. In the embodiment, the user touches the second touch display device 540 with the ring finger of the left hand and slides inward. However, although the portable electronic device 500 may verify the gesture of the user (e.g. steps S734, S735 and S736), the portable electronic device 500 does not perform any operation since the portable electronic device 500 is not set up to execute the application associated with the left-hand mode and the gesture. Then, the portable electronic device 500 senses the touch input again through the second touch display device 540 (e.g. steps S734 and S736).

It is to be noted that the above two exemplary embodiments are merely to illustrate two possible scenarios of utilizing the portable electronic device 500, but the invention is not limited thereto. Operation procedures in each step in FIGS. 7A and 7B may be adjusted correspondingly according to all kinds of manners that the user utilizes the portable electronic device 500.

In order that the skilled person has a better understanding of how to utilize the portable electronic device as recited in each embodiment of the invention, FIGS. 8A, 8B, 9A and 9B below are schematic views respectively illustrating that the user utilizes the portable electronic device with the left hand, the right hand and the both hands.

Figure 8A:
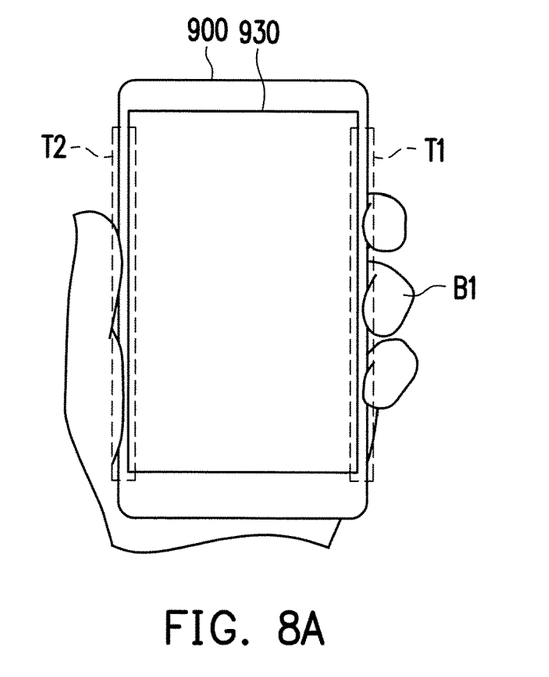
FIG. 8A is a schematic view of a right-hand mode according to an embodiment of the invention.

FIG. 8A is a schematic view of the left-hand mode according to an embodiment of the invention. Referring to FIG. 8A, FIG. 8A illustrates that the user holds a portable electronic device 900 with the left hand B1. In this case, a first touch display device 930 of the portable electronic device 900 is directed toward the user. Touch points of a plurality of fingers of the user may be sensed through a sensing region T1 of the first touch sensing device of the portable electronic device 900, and the respective touch points of these fingers involve a small range. Moreover, touch points of a larger area of the first dorsal interosseous of the user may be sensed through a sensing region T2 of the second touch sensing device of the portable electronic device 900. Therefore, the portable electronic device 900 may be operated in the left-hand mode.

Figure 8B:
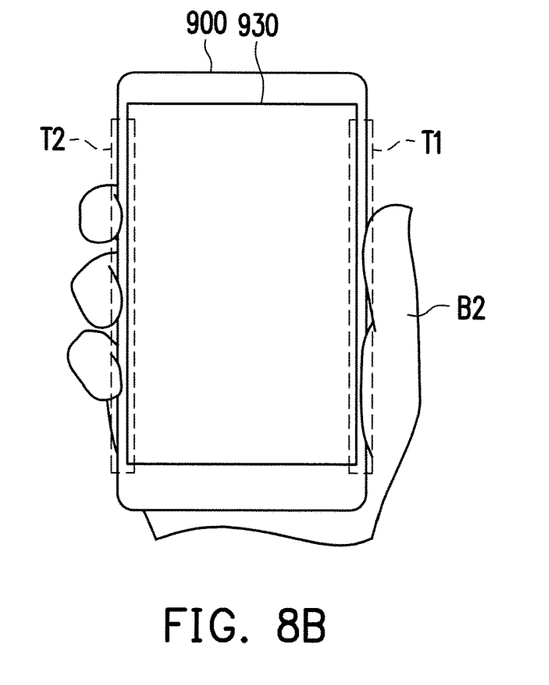
FIG. 8B is a schematic view of a left-hand mode according to an embodiment of the invention.

FIG. 8B is a schematic view of the right-hand mode according to an embodiment of the invention. Referring to FIG. 8B, FIG. 8B illustrates that the user holds the portable electronic device 900 with the right hand B2. In this case, the first touch display device 930 of the portable electronic device 900 is directed toward the user. The touch points of the larger area of the first dorsal interosseous of the user may be sensed through the sensing region T1 of the first touch sensing device of the portable electronic device 900. Moreover, the touch points of the plurality of fingers of the user may be sensed through the sensing region T2 of the second touch sensing device of the portable electronic device 900, and the respective touch points of these fingers involve a smaller range. Therefore, the portable electronic device 900 may be operated in the right-hand mode.

In other words, an operation mode of the portable electronic device 900 depends on whether the sensed result by the sensing region T1 and the sensing region T2 satisfies a distribution condition of the touch points that are pre-stored. Moreover, in an embodiment, the portable electronic device 900 may further sense the hand print (palm prints or fingerprints) of the user through at least one of the sensing region T1 and the sensing region T2 to further execute the unlocking operation or the corresponding application.

Figure 9A:
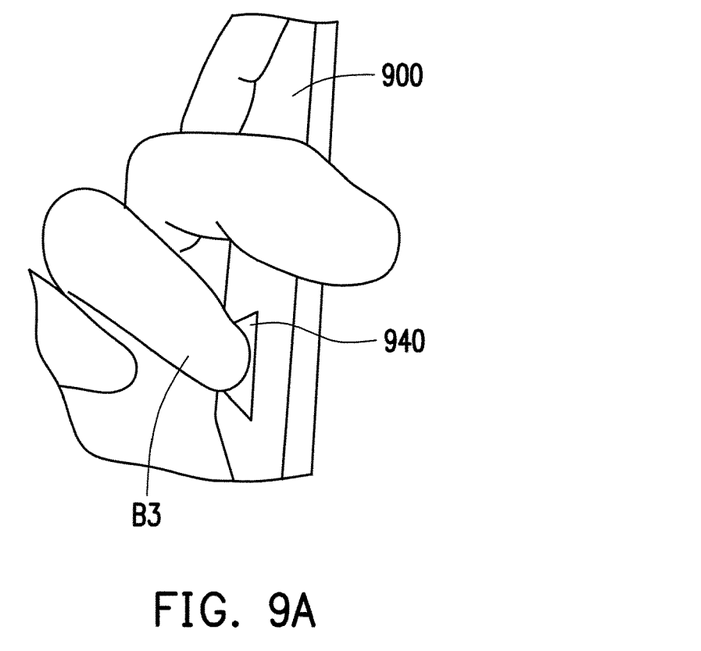
FIG. 9A is a schematic view of a single-hand operation according to an embodiment of the invention.

FIG. 9A is a schematic view of a single-hand operation according to an embodiment of the invention. Referring to FIG. 9A, the situation as illustrated in FIG. 9A shows that the user holds the portable electronic device 900 with the single hand. In this case, a finger B3 of the user is able to touch a second touch display device 940 of the portable electronic device 900. Moreover, when the finger B3 of the user touches the second touch display device 940, the second touch display device 940 is operated to sense the gesture of the user and produces the corresponding gesture information. Therefore, the portable electronic device 900 executes the corresponding application through the sensed gesture information.

Figure 9B:
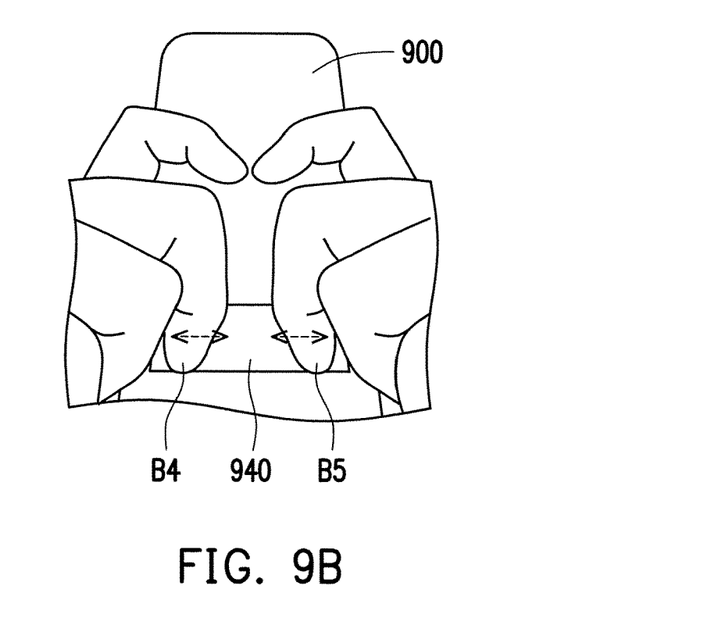
FIG. 9B is a schematic view of a both-hand operation according to an embodiment of the invention.

FIG. 9B is a schematic view of a both-hand operation according to an embodiment of the invention. Referring to FIG. 9B, the situation as illustrated in FIG. 9B shows that the user holds the portable electronic device 900 with the both hands. In this case, a finger B4 of the left hand and a ringer B5 of the right hand of the user are able to touch the second touch display device 940 of the portable electronic device 900. Moreover, when the fingers of the user touch the second touch display device 940, the second touch display device 940 is operated to sense the gesture of the user and produces the corresponding gesture information. Therefore, the portable electronic device 900 executes the corresponding application through the sensed gesture information.

Figure 10:
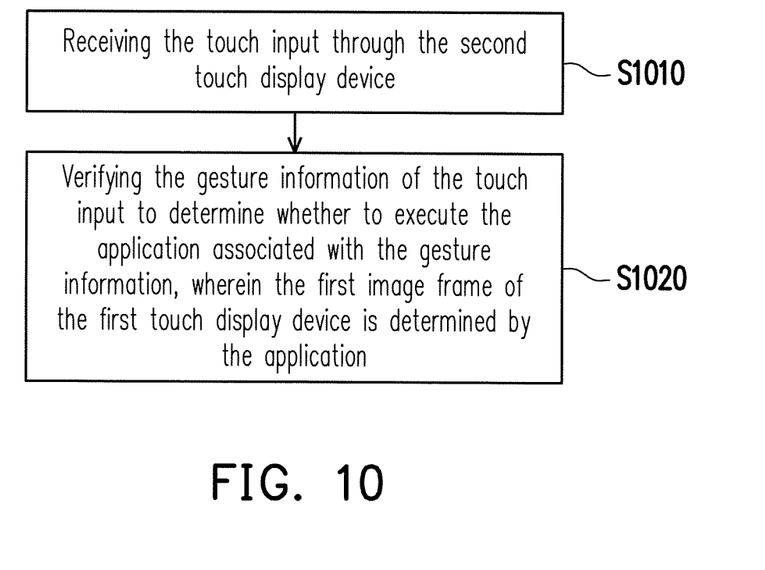
FIG. 10 is a flowchart of an operation method according to yet another embodiment of the invention.

FIG. 10 is a flowchart of an operation method according to yet another embodiment of the invention. Referring to FIGS. 1 and 10, the operation method of FIG. 10 may be suitable for at least the portable electronic device 100 of FIG. 1. Firstly, in step S1010, the processing device 110 receives the touch input through the second touch display device 140. Then, in step S1020, the processing device 110 verifies the gesture information of the touch input to determine whether to execute the application associated with the gesture information. The first image frame of the first touch display device 130 is determined by the application. Therefore, the portable electronic device 100 according to the embodiments of the invention is able to operate the relevant application as displayed in the first touch display device 130 according to the touch result by the second touch display device 140.

Besides, regarding the features and implementing details of the portable electronic device according to the embodiments of the invention, the embodiments in FIGS. 1 to 9B provide sufficient teachings, suggestions and descriptions about implementation. Therefore, it is unnecessary to give more details here.

Based on the above, the portable electronic device according to the embodiments of the invention may include the first touch display device and the second touch display device. The content of the image frame of the first touch display device may determine by the touch input received by the second touch display device. Moreover, the portable electronic device according to the embodiments of the invention may further include the first touch display device and the second touch display device. The first touch display device and the second touch display device are configured to determine the manner that the user holds the portable electronic device to adjust the operation mode of the portable electronic device correspondingly and further provide the unlocking function, the function of sensing pressure and the function of offering a force feedback. Consequently, the portable electronic device according to the embodiments of the invention may provide convenient and versatile display functions and touch functions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device, having a device body, comprising:
   a first touch display device, disposed on a first surface of the display body and configured to display a first image frame;
   a second touch display device, disposed on a second surface of the display body, configured to display a second image frame and receive a touch input, wherein the first surface is opposite to the second surface;
   a processing device, coupled to the first touch display device and the second touch display device, and configured to verify gesture information of the touch input to determine whether to execute an application associated with the gesture information; and
   a sensing device, coupled to the processing device and configured to sense a vertical axial parameter and an illumination parameter of the second touch display device,
   wherein the first image frame of the first touch display is determined by the application,
   wherein the processing device determines that the second touch display device is lying downward or lying upward according to the vertical axial parameter and the illumination parameter to respectively display the second image frame of the second touch display device as an information mode or a picture mode.

2. The portable electronic device according to claim 1, wherein the second touch display device comprises an electronic paper display panel.

3. The portable electronic device according to claim 1, wherein when the gesture information of the input touch does not pass verification, the processing device reads a gesture learning database, and further verifies whether the touch input is operable according to the gesture learning database.

4. The portable electronic device according to claim 1, further comprising:
- a first touch sensing device, disposed on a third surface of the display body, coupled to the processing device, and configured to sense first touch information; and
- a second touch sensing device, disposed on a fourth surface of the display body, coupled to the processing device and configured to sense second touch information, wherein the third surface is opposite to the fourth surface,
- wherein the processing device determines whether to set up an unlocking request, so that the first touch display device displays a main picture or an unlocking picture.

5. The portable electronic device according to claim 4, wherein the processing device determines to execute a left-hand mode, a right-hand mode or a both-hand mode according to distribution of respective touch points of the first touch information and the second touch information.

6. The portable electronic device according to claim 4, wherein the processing device senses hand print feature information through at least one of the first touch sensing device and the second touch sensing device, and the processing device determines whether the hand print feature information conforms to default hand print feature information, so that the first touch display device displays the main picture.

7. The portable electronic device according to claim 4, wherein at least one of the first touch sensing device and the second touch sensing device is further configured to provide a force feedback according to a press force when the press force is received.

8. A method of operating a portable electronic device suitable for a portable electronic device including a first touch display device and a second touch display device, the method comprising:
- receiving a touch input through the second touch display device;
- verifying gesture information of the touch input to determine whether to execute an application associated with the gesture information; and
- sensing a vertical axial parameter and an illumination parameter of the second touch display device through a sensing device, and determining that the second touch display device is lying downward or lying upward according to the vertical axial parameter and the illumination parameter to respectively display a second image frame of the second touch display device as an information mode or a picture mode,
- wherein a first image frame of the first touch display device is determined by the application.

9. The method according to claim 8, wherein the second touch display device comprises an electronic paper display panel.

10. The method according to claim 8, further comprising:
- reading a gesture learning database when the gesture information of the touch input does not pass verification, and further verifying whether the touch input is operable according to the gesture learning database.

11. The method according to claim 8, wherein the portable electronic device further comprises a first touch sensing device and a second touch sensing device, the method comprising:
- sensing first touch information through the first touch sensing device and second touch information through the second touch sensing device; and
- determining whether to set up an unlocking request, so that the first touch display device displays a main picture or an unlock picture.

12. The method according to claim 11, further comprising:
- determining to execute a left-hand mode, a right-hand mode or a both-hand mode according to distribution of respective touch points of the first touch information and the second touch information.

13. The method according to claim 11, further comprising:
- sensing hand print feature information through at least one of the first touch sensing device and the second touch sensing device; and
- determining whether the hand print feature information conforms to default hand print feature information, so that the first touch display device displays the main picture.

14. The method according to claim 11, wherein at least one of the first touch sensing device and the second touch sensing device is further configured to provide a force feedback according to a press force when the press force is received.

* * * * *